United States Patent
Ishii et al.

(10) Patent No.: US 8,194,176 B2
(45) Date of Patent: Jun. 5, 2012

(54) SWITCHING MECHANISM FOR OPTICAL COMPONENT, LENS BARREL, AND IMAGING DEVICE

(75) Inventors: Atsuya Ishii, Kanagawa (JP);
Tadatsugu Nishida, Kanagawa (JP);
Atsushi Horidan, Kanagawa (JP);
Junichi Maenishi, Tokyo (JP)

(73) Assignee: Sony Corporation (JP)

( * ) Notice: Subject to any disclaimer, the term of this patent is extended or adjusted under 35 U.S.C. 154(b) by 363 days.

(21) Appl. No.: 12/653,509

(22) Filed: Dec. 15, 2009

(65) Prior Publication Data
US 2010/0165173 A1   Jul. 1, 2010

(30) Foreign Application Priority Data
Dec. 26, 2008 (JP) ................... P2008-334609

(51) Int. Cl.
*H04N 5/225* (2006.01)
(52) U.S. Cl. ........................................... 348/360
(58) Field of Classification Search ............. 348/360
See application file for complete search history.

(56) References Cited

U.S. PATENT DOCUMENTS

| | | | |
|---|---|---|---|
| 7,619,680 B1* | 11/2009 | Bingle et al. | 348/361 |
| 7,746,386 B2* | 6/2010 | Nakamura et al. | 348/224.1 |
| 2006/0291073 A1* | 12/2006 | Nomura | 359/694 |
| 2008/0143868 A1* | 6/2008 | Tsuchiya et al. | 348/360 |

FOREIGN PATENT DOCUMENTS

| | | |
|---|---|---|
| JP | 02171739 A | 7/1990 |
| JP | 11-194417 A | 7/1999 |
| JP | 2001264610 A | 9/2001 |
| JP | 2003161982 A | 6/2003 |
| JP | 2006047805 A | 2/2006 |

OTHER PUBLICATIONS

Office Action from Japanese Application No. 2008-334609, dated May 24, 2011.

* cited by examiner

*Primary Examiner* — James Hannett
(74) *Attorney, Agent, or Firm* — Lerner, David, Littenberg, Krumholz & Mentlik, LLP

(57) ABSTRACT

A switching mechanism for optical component includes: an optical component; a holder member holding the optical component; a drive mechanism having a drive motor that drives the optical component held by the holder member to rotate on a plane orthogonal to an optical axis from an optical axis position at which the optical component is on the optical axis to an evacuation position at which the optical component is off the optical axis; and a restriction member restricting a rotation of the holder member, by which at least a rotation of the optical component held by the holder member is restricted at the optical axis position. The drive mechanism includes the drive motor, a worm attached to a rotation shaft of the drive motor, and a worm wheel meshed with the worm and provided to the holder member.

7 Claims, 13 Drawing Sheets

SWITCHING MECHANISM FOR OPTICAL COMPONENT, LENS BARREL, AND IMAGING DEVICE

CROSS-REFERENCE TO RELATED APPLICATION

The present application claims priority from Japanese Patent Application No. JP 2008-334609 filed in the Japanese Patent Office on Dec. 26, 2008, the entire content of which is incorporated herein by reference.

BACKGROUND OF THE INVENTION

1. Field of the Invention

The present invention relates to a switching mechanism for optical component employed in a camera or the like to allow switching between a state where an optical component that shields infrared light is on the optical axis and a state where the optical component is off the optical axis, a lens barrel using this switching mechanism, and an imaging device provided with this lens barrel.

2. Description of Related Art

In a video camera and a digital still camera configured to take a moving image and a still image, a lens barrel is provided to a camera main body as an integral part or as a separate component. The lens barrel includes, for example, a lens group furnished with a variable magnification function, a lens group furnished with a function of correcting a field fluctuation associated with a change of magnification or a change of a subject distance are assembled in a cylindrical barrel main body.

In this lens barrel, various filters to adjust an amount of incident light, for example, an infrared light cut filter to shield infrared light is provided on the optical path.

Incidentally, a variety of imaging modes are available with a video camera in recent years. Besides normal imaging, a so-called night-shot imaging mode enabling nighttime imaging is now available in some types of video camera. In the night-shot imaging mode, it is necessary to actively let infrared light in. It is therefore necessary to remove the infrared light cut filter described above from the optical path.

To this end, there has been proposed a lens barrel provided with a switching mechanism for optical component, which is a mechanism that moves the infrared light cut filter to the outside of the optical path. An example of such a lens barrel is described in JP-A-11-194417.

This switching mechanism for optical component includes a type configured in such a manner that switching is made manually and a type configured in such a manner that switching is made electrically using a motor as a drive source. In the case of the manual switching, there is a risk of failure because an extra load may possibly be applied on the mechanical mechanism depending on a manner of operation by the user.

Meanwhile, in the case of the electrical switching, a link mechanism used to transmit drive power from the motor becomes complicated and rattling may possibly occur depending on an assembly accuracy of the link mechanism. Further, because a slightly oversized optical component is used by taking the rattling into account in the case of the electrical switching, the lens barrel itself undesirably becomes larger and more expensive.

SUMMARY OF THE INVENTION

It is desirable to provide a switching mechanism for optical component configured to move an optical component back and forth to be on and off the optical path while avoiding inaccurate positioning caused by rattling as well as a lens barrel and an imaging device each having this switching mechanism.

According to an embodiment of the present invention, there is provided a switching mechanism for optical component including an optical component, a holder member holding the optical component, a drive mechanism having a drive motor that drives the optical component held by the holder member to rotate on a plane orthogonal to an optical axis from an optical axis position at which the optical component is on the optical axis to an evacuation position at which the optical component is off the optical axis, and a restriction member restricting a rotation of the holder member, by which at least a rotation of the optical component held by the holder member is restricted at the optical axis position. The drive mechanism includes the drive motor, a worm attached to a rotation shaft of the drive motor, and a worm wheel meshed with the worm and provided to the holder member. A rotation feed direction in which the optical component is driven toward the restriction member at the optical axis position with a rotation of the worm is a direction in which the optical component comes close to the drive motor.

According to another embodiments of the present invention, there are provided a lens barrel and an imaging device each including the switching mechanism for optical component described above.

According to the embodiments of the present invention, the rotation feed direction in which the optical component is driven toward the restriction member at the optical axis position with a rotation of the worm provided to the drive motor is aligned with a direction in which the optical component comes close to the drive motor. Hence, by further driving the drive motor in a state where the optical component is restricted by the restriction member, a force is exerted in a direction in which the rotation shaft attached with the worm is pulled out from the drive motor. However, a force pulling back the rotation shaft into the drive motor acts on the rotation shaft and a force acts in a direction in which the worm comes close to the drive motor after the drive motor is stopped due to the pulling back force. Because a force acts in a direction in which the worm comes close to the drive motor, a force acts in a direction in which the optical component is headed toward the restriction member via the worm wheel meshed with the worm. It thus becomes possible to keep the holder member to be held at the optical axis position. Accordingly, the positioning of the optical component held by the holder member is performed precisely at the optical axis position. It is therefore no longer necessary to slightly oversize the optical component by taking rattling or the like into account.

DESCRIPTION OF THE PREFERRED EMBODIMENTS

Hereinafter, a lens barrel having switching mechanisms for optical component according to embodiments of the present invention will be described in detail with reference to the drawings in order of a first embodiment, a second embodiment, and a modification.

First Embodiment

Figure 1:
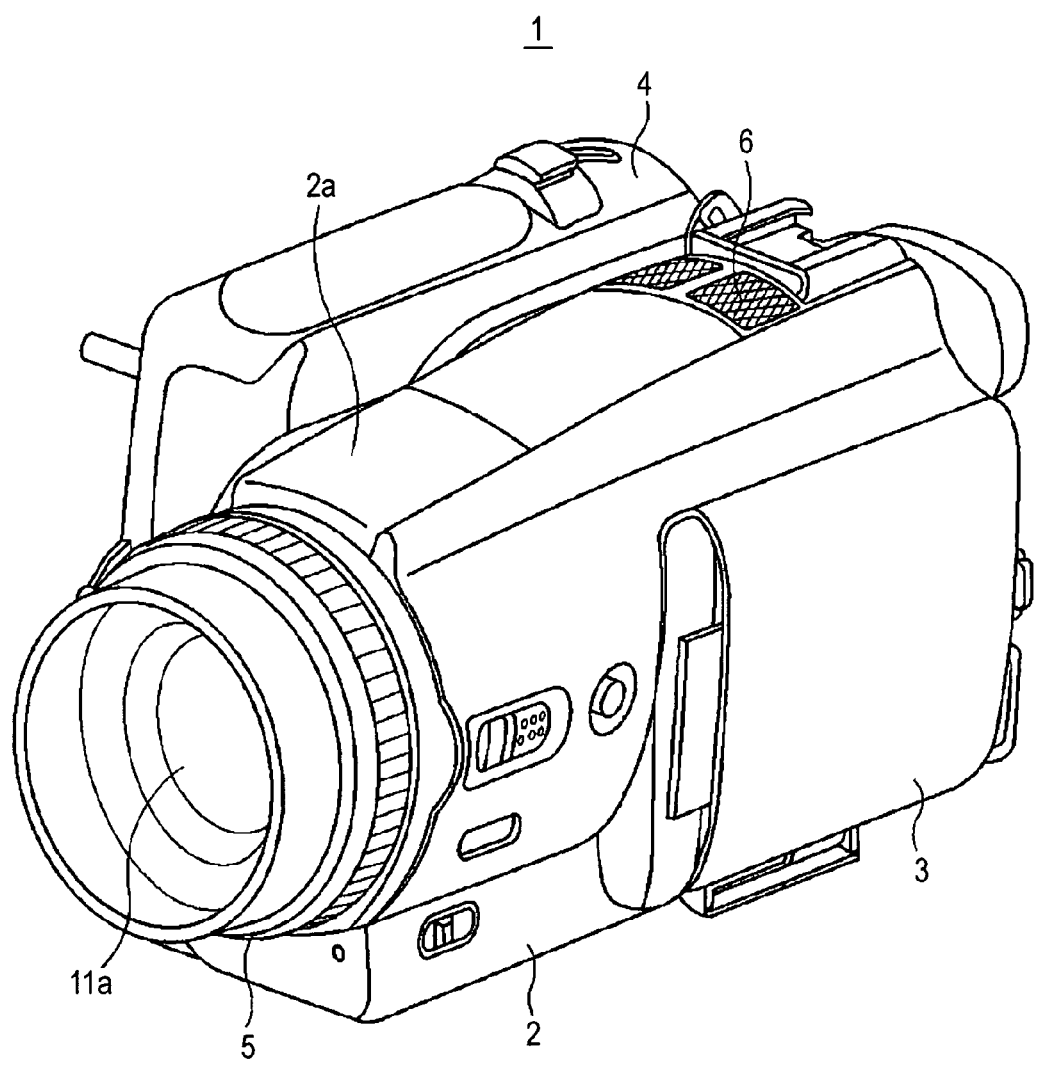
FIG. 1 is a perspective view showing an outward appearance of an imaging device provided with a lens barrel to which an embodiment of the present invention is applied.

A lens barrel 5 according to an embodiment of the present invention described hereinafter as a first embodiment is employed in a digital video camera 1 as shown in FIG. 1 and it is furnished with a so-called zoom function of making a focal point variable. It should be appreciated, however, that the lens barrel 5 is not necessarily employed in the digital video camera 1 and it may be integrally attached to an electronic still camera chiefly taking still images or employed as an interchangeable lens of a single-lens reflex camera.

Imaging Device

The digital video camera 1 described herein as an imaging device includes, for example, a main body portion 2, a panel portion 3 attached to the main body portion 2 on one side surface in an openable and closable manner, and a grip portion 4 attached to the main body portion 2 on the other side surface opposite to the panel portion 3 in a rotatable manner.

The main body portion 2 has an imaging unit that takes an image of a subject. The lens barrel 5 is provided to the front surface of the main body portion 2 to protrude outward so that a first group lens 11 is faced to the outside. In addition, a stereo microphone 6, such as a microphone, is provided to the top surface 2a of the main body portion 2 as a sound pick-up unit that picks up sounds.

Lens Barrel

Figure 2:
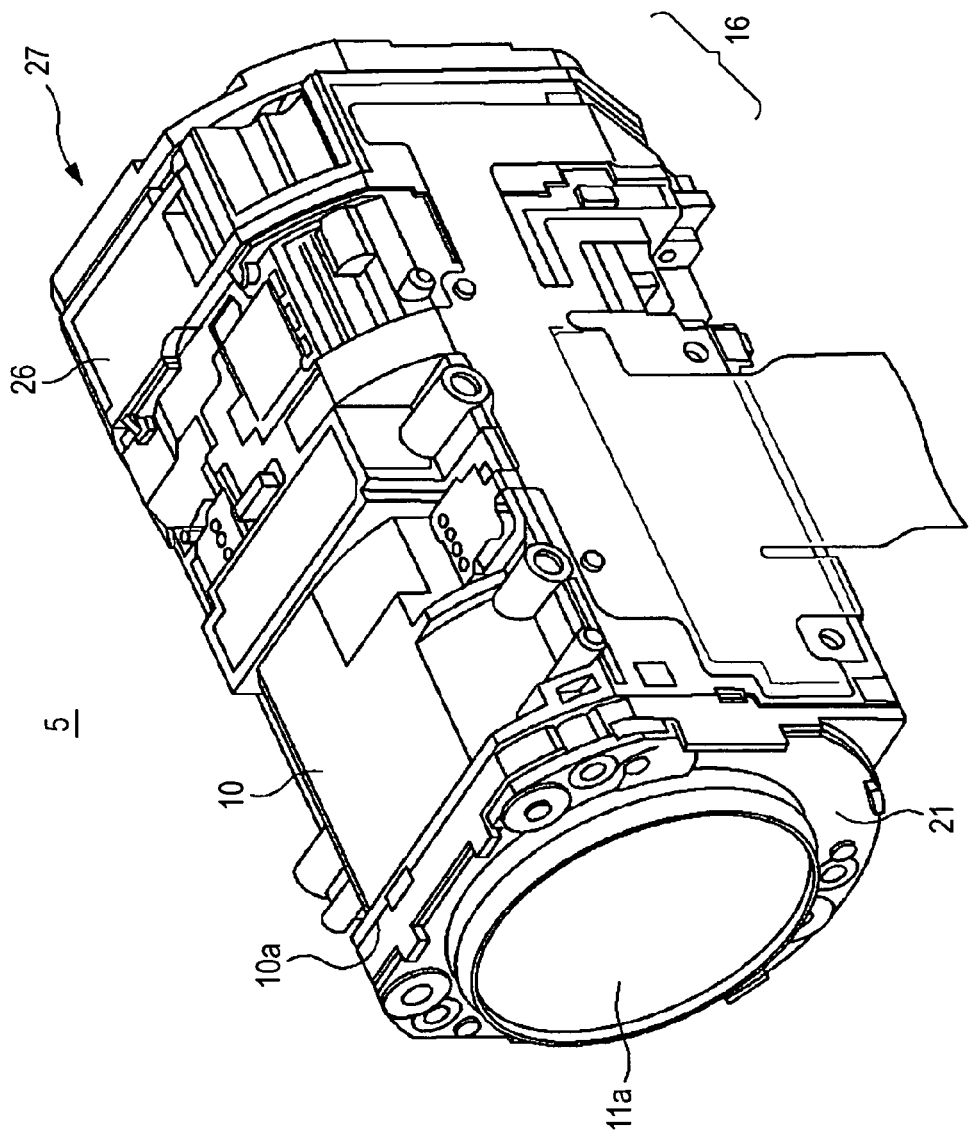
FIG. 2 is a perspective view showing an outward appearance of the lens barrel to which an embodiment of the present invention is applied.

As is shown in FIG. 2, the lens barrel 5 is provided with a barrel main body 10 of substantially a cylindrical shape as a whole, a plurality of lens groups 11 through 15 formed inside the barrel main body 10, and an infrared light cut glass switching portion 16. It should be noted that the lens barrel 5 shown in FIG. 2 is disposed inside the main body portion 2 of the digital video camera 1 except for a part of the first group lens 11. For this reason, FIG. 2 shows a state where a decorative panel is removed. However, a grip portion, the decorative panel, and so forth are also provided in a case where the lens barrel 5 is used as an interchangeable lens.

Figure 3:
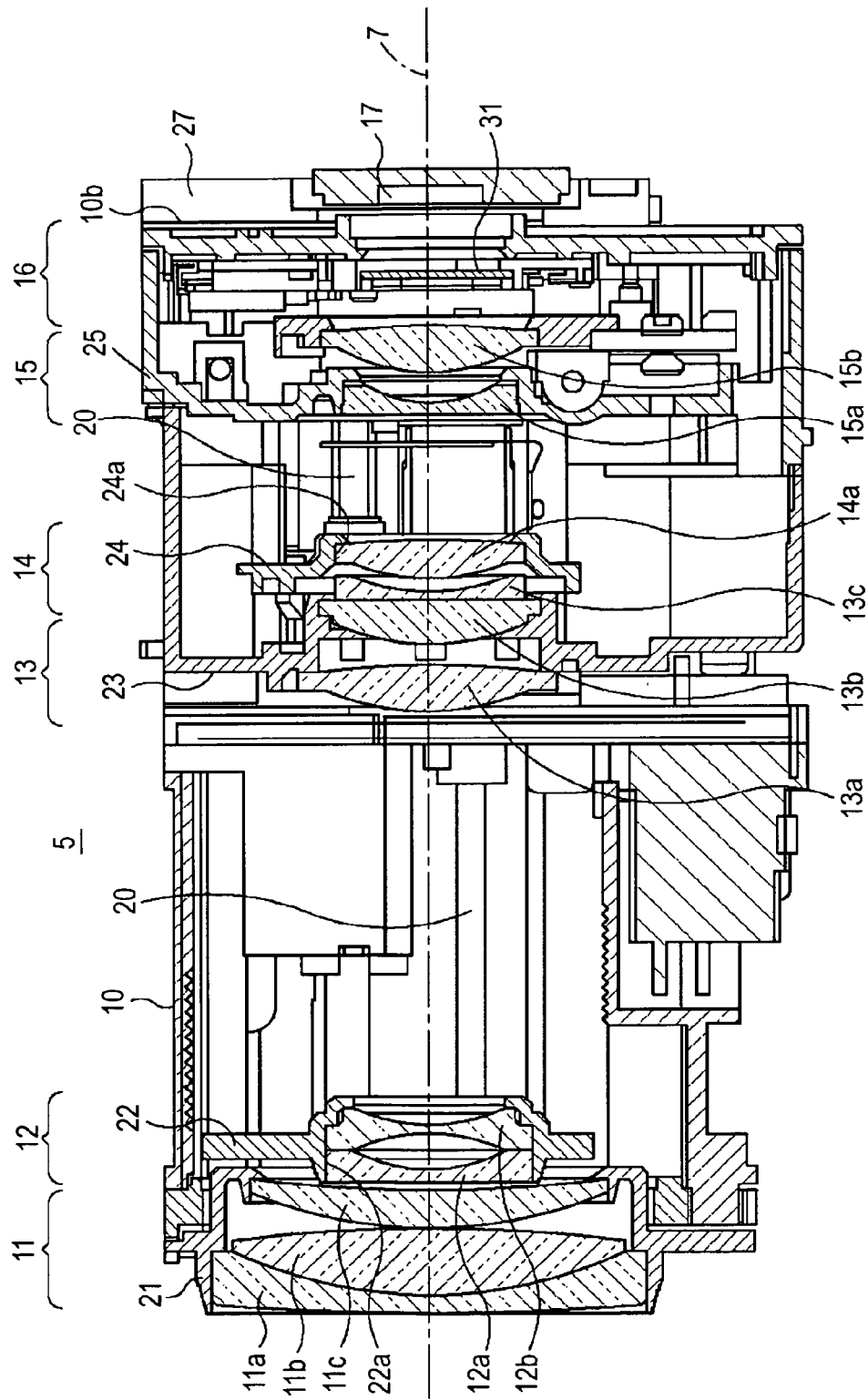
FIG. 3 is a cross section of the lens barrel to which an embodiment of the present invention is applied.
Figure 4:
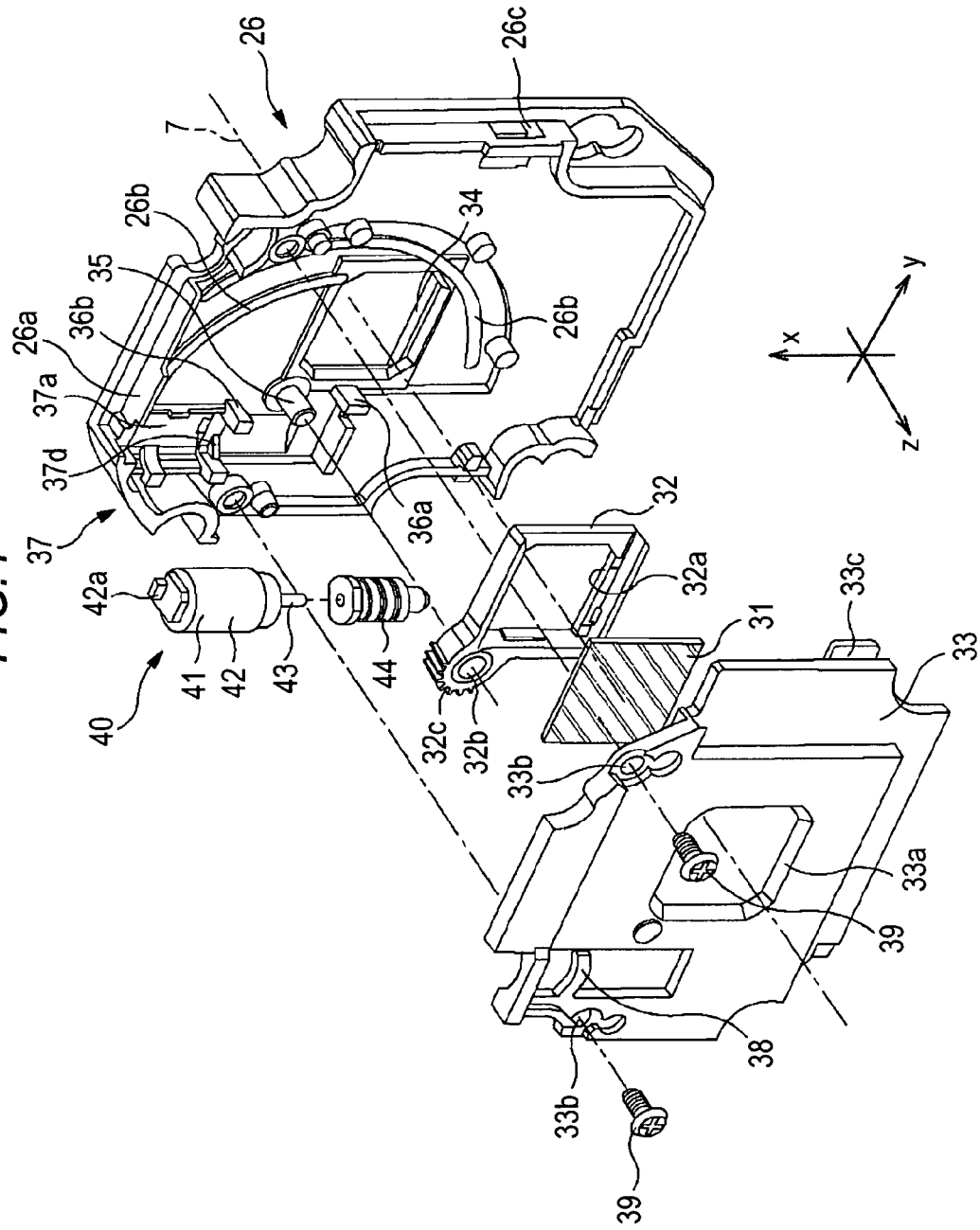
FIG. 4 is a perspective view of an assembly of an infrared light cut glass switching portion to which an embodiment of the present invention is applied.
Figure 5A:
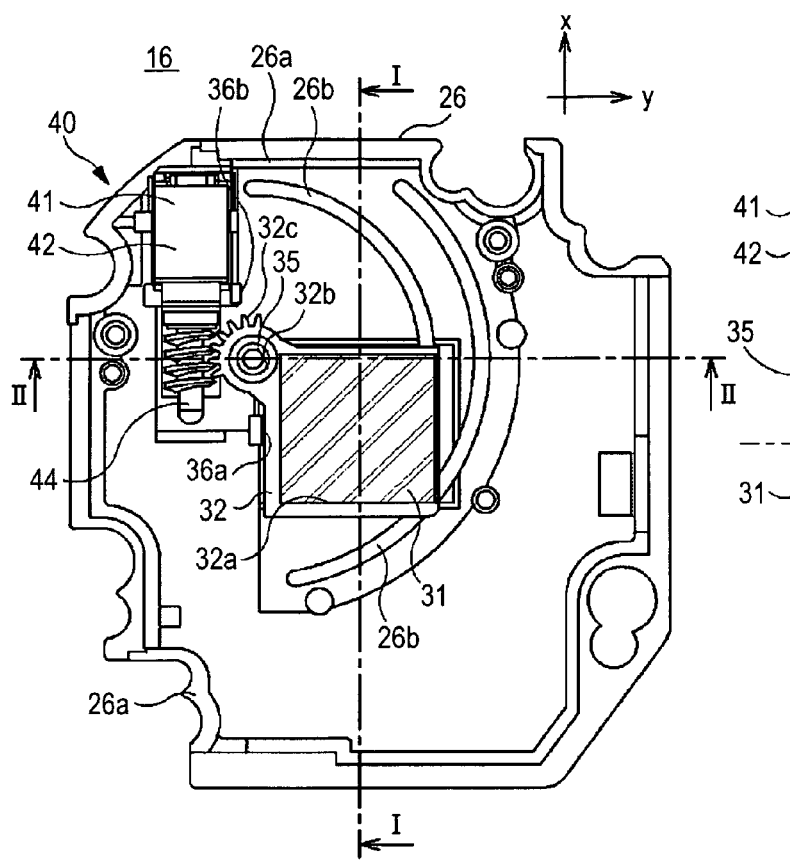
FIG. 5A is a plan view of the infrared light cut glass switching portion.
Figure 5B:
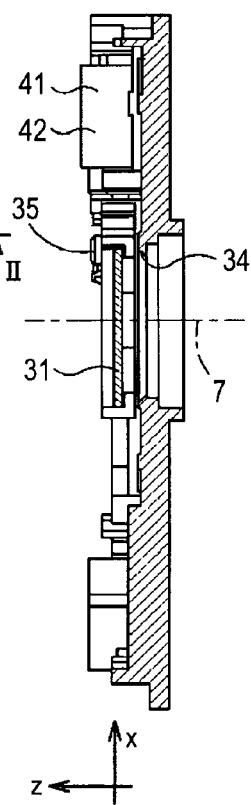
FIG. 5B is a cross section taken on line I-I of FIG. 5A.
Figure 5C:
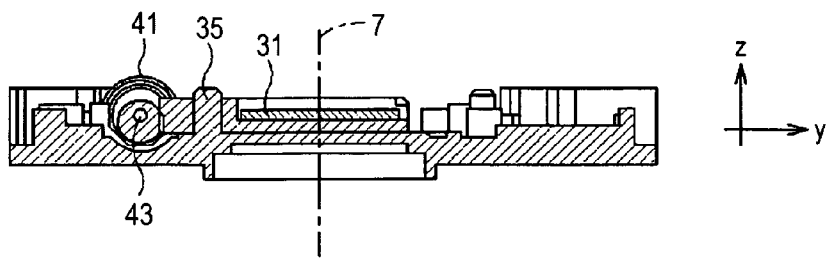
FIG. 5C is a cross section taken on line II-II of FIG. 5A.

As is shown in FIG. 3, a plurality of lens units are held in the lens barrel 5. The lens system held in the lens barrel 5 is a lens system formed of five group lenses 11 through 15, which are lens groups, or namely, five sets of lens units, disposed on the same optical axis 7. These five group lenses 11 through 15 are attached to the barrel main body 10 of substantially a cylindrical shape. In addition, the lens barrel 5 has a plurality of guide shafts 20 installed inside the barrel main body 10 from one wall surface to the opposing wall surface. Both a second lens group 12 and a fourth group lens 14 and the guide shafts 20 are fit together by insertion in a slidable manner.

FIG. 3 shows a case where two guide shafts 20 are formed. It should be appreciated, however, that the number of the guide shafts 20 is not limited to two and as many guide shafts 20 as necessary can be formed. Also, descriptions have been given to a case where both the second group lens 12 and the fourth group lens 14 and the guide shafts 20 are fit together by insertion. It should be appreciated, however, that the present invention is not limited to this configuration. It may be configured in such a manner that guide shafts are provided to respective group lenses so that one group lens and corresponding one guide shaft are fit together by insertion.

The barrel main body 10 holding the five group lenses 11 through 15 and the infrared light cut glass switching portion 16 is formed in substantially a cylindrical shape into which light is injected from one end 10a and it is formed by resin mold. The barrel main body 10 is provided with the first group lens 11 at the one end 10a and an imaging element 17 on the other end 10b.

The five group lenses 11 through 15 held by the barrel main body 10 are disposed inside the barrel main body 10 sequentially from the subject side in such a manner that the optical axes 7 coincide with one another. The first group lens 11, the third group lens 13, and the fifth group lens 15 are fixed to the barrel main body 10 while the second group lens 12 and the fourth group lens 14 are held in a movable manner in the direction of the optical axis 7.

Of the five group lenses 11 through 15, the first group lens 11 disposed at the one end 10a of the barrel main body 10 includes three objective lenses disposed oppositely to a subject: a first lens 11a, a second lens 11b, and a third lens 11c. The first through third lenses 11a through 11c of the first group lens 11 are held by a first group lens holding frame 21 that holds the lens peripheries and fixed at the one end 10a of the barrel main body 10 via the first group lens holding frame 21. The first lens 11a of the first group lens 11 has an effective diameter large enough to obtain a sufficient amount of ambient light, which is substantially as large as the diameter of the barrel main body 10. In short, the size of the barrel main body 10 is determined by the diameter of the first lens 11a. Incident light passes through the first group lens 11 in order of the first lens 11a, the second lens 11b, and the third lens 11c and exits to go incident on the second group lens 12.

The second group lens 12 includes a lens 12a having a positive refractive index and a lens 12b having a negative refractive index and is furnished with so-called a variable magnification function, that is, a function of changing the angle of view by moving on the optical axis 7 in telescopic and wide-angle directions. The lenses 12a and 12b of the second group lens 12 are held by a second group lens holding frame 22 that holds the lens peripheries. The second group lens holding frame 22 has a through-hole 22a penetrating through the center portion in the thickness direction, that is, in the optical axis direction, and the lenses 12a and 12b are attached to this through-hole 22a. The second group lens holding frame 22 also has unillustrated through-holes in the outside of the optical path. The guide shafts 20 are inserted through these through-holes so that the second group lens holding frame 22 is allowed to slide in the axial direction of the guide shafts 20, that is, in the optical axis direction. A drive motor is connected to the second group lens holding frame 22 and the second group lens holding frame 22 is driven in the optical axis direction by a drive force from the drive motor. Light having passed through the lenses 12a and 12b of the second group lens 12 is injected into the third group lens 13.

The third group lens 13 includes two lenses 13a and 13b each having a positive refractive index and a lens 13c having a negative refractive index, all of which are fixed to the barrel main body 10 via a third group lens holding frame 23. The fourth group lens 14 including a lens 14a is disposed in the latter stage of the third group lens 13.

The fourth group lens 14 is furnished with a so-called focus function, that is, a function of not only changing magnification by moving on the optical axis 7 in the telephoto and wide directions within the barrel main body 10 in the latter stage of the third group lens 13 but also correcting a field fluctuation associated with a change of the subject distance. The lens 14a of the fourth group lens 14 is held by a fourth group lens holding frame 24 that holds the lens periphery.

As with the second group lens holding frame 22, the fourth group lens holding frame 24 has a through-hole 24a penetrating through the center portion in the thickness direction, that is, in the optical axis direction and the lens 14a is attached to this through-hole 24a. The fourth group lens holding frame 24 also has unillustrated through-holes in the outside of the optical path and the guide shafts 20 are inserted through these through-holes. The fourth group lens holding frame 24 is thus allowed to slide along the guide shafts 20, that is, in the optical axis direction. A drive motor is connected to the fourth group lens holding frame 24 and the fourth group lens holding frame 24 is driven in the optical axis direction by a drive force from the drive motor. The fifth group lens 15 including lenses 15a and 15b is disposed in the latter stage of the fourth group lens 14.

The fifth group lens 15 includes one lens 15a having a negative refractive index and a lens 15b having a positive refractive index, both of which are fixed to the barrel main body 10 via a fifth group lens holding frame 25. The infrared light cut glass switching portion 16 that brings an infrared light cut glass 31 on or off the optical axis 7 is disposed in the latter stage of the fifth group lens 15.

The infrared light cut glass switching portion 16 is fixed to the barrel main body 10 via a chassis 26 and brings the infrared light cut glass 31 on and off the optical axis 7 by rotating the infrared light cut glass 31 on the chassis 26. The infrared light cut glass switching portion 16 will be described in detail below.

The imaging element 17 (CCD (Charge-Coupled Device), a CMOS (Complementary Metal-Oxide Semiconductor), or the like) is disposed in the latter stage of the infrared light cut glass switching portion 16. The imaging element 17 is provided to be positioned on the optical axis 7 at the other end 10b of the barrel main body 10 of the lens barrel 5. The imaging element 17 is held by a holding frame 27 that holds the periphery of the imaging element 17 and fixed to the barrel main body 10 at the other end 10b via the holding frame 27. It should be appreciated, however, that the imaging element 17 is not necessarily attached to the lens barrel 5 and it may be configured in such a manner that the imaging element 17 is fixed to the main body portion 2 of the digital video camera 1 separately from the lens barrel 5.

The second group lens 12 and the fourth group lens 14 move independently along the optical axis 7 in the telephoto direction and in the wide direction. The second group lens 12 and the fourth group lens 14 adjust the zoom (variable magnification) and the focus by moving in the telephoto direction or in the wide direction. More specifically, at the time of zooming, the zoom is adjusted by moving the second group lens 12 and the fourth group lens 14 from wide (wide angle) to telephoto (telescopic). Also, at the time of focusing, the focus is adjusted by moving the fourth group lens 14 from wide (wide angle) to telephoto (telescopic).

It should be appreciated that the lens barrel 5 is not limited to the five-group lens structure as described above and any lens barrel having a barrel main body and at least one lens group provided to the barrel main body is available. For example, the lens barrel 5 may further include a correction lens that corrects image blurring caused by vibrations or the like in the latter stage of the fourth group lens 14. Alternatively, the lens barrel 5 may have a polarization filter having an aperture mechanism that is disposed in the preceding stage of the third group lens 13 or interposed between the lens 13a and the lens 13b.

Infrared Light Cut Glass Switching Portion

The infrared light cut glass switching portion 16 provided in the latter stage of the fifth group lens 15 will now be described in detail.

As are shown in FIG. 4 and FIGS. 5A through 5C, the infrared light cut glass switching portion 16 includes the chassis 26, the infrared light cut glass 31 as one of optical components, a holder member 32 that holds the infrared cut glass 31, a drive mechanism 40 that drives the holder member 32 to rotate, and a cover member 33 that fixes the drive mechanism 40 and the like to the chassis 26. The infrared light cut glass switching portion 16 moves the infrared cut glass 31 that cuts the infrared light back and forth between an optical axis position at which the infrared light cut glass 31 is on the optical axis 7 and an evacuation position at which the infrared light cut glass 31 is off the optical axis 7.

For ease of description, descriptions will be given on the assumption that the optical axis direction is the z axis direction, a vertical direction when the infrared light cut glass switching portion 16 is disposed in the barrel main body 10 and orthogonal to the z axis is the x axis direction, and a horizontal direction orthogonal to the z axis and the x axis is the y axis direction.

The chassis 26 of the infrared light cut glass switching portion 16 has the principal surface formed by resin mold in substantially the same shape as the cross section of the barrel main body 10. The chassis 26 has a rising wall portion 26a on the rim of the principal surface and the holder member 32 and the drive mechanism 40 are accommodated in a region surrounded by the rising wall portion 26a. At substantially the center of its principal surface, the chassis 26 is provided with an opening portion 34 that will serve as an optical path of exiting light from the fifth group lens 15. Also, in the vicinity of the opening portion 34, the chassis 26 is provided with a boss 35 standing in the z axis direction so as to serve as a rotation shaft of the holder member 32. Further, the chassis 26 is provided with two restriction pieces 36a and 36b that restrict rotations of the hold member 32. The restriction pieces 36a and 36b are, so to speak, members that define the mechanical ends of the holder member 32. One restriction piece 36a defines the optical axis position at which the infrared light cut glass 31 is on the optical axis 7 and the other restriction piece 36b defines the evacuation position at which the infrared light cut glass 31 is off the optical axis 7. Further, on a rotation region of the holder member 32, the chassis 26 is provided with a circular slide piece 26b on which to slide the holder member 32. Moreover, a positioning hole 26c used for the positioning of the cover member 33 is formed in the rising wall portion 26a of the chassis 26.

Figure 6:
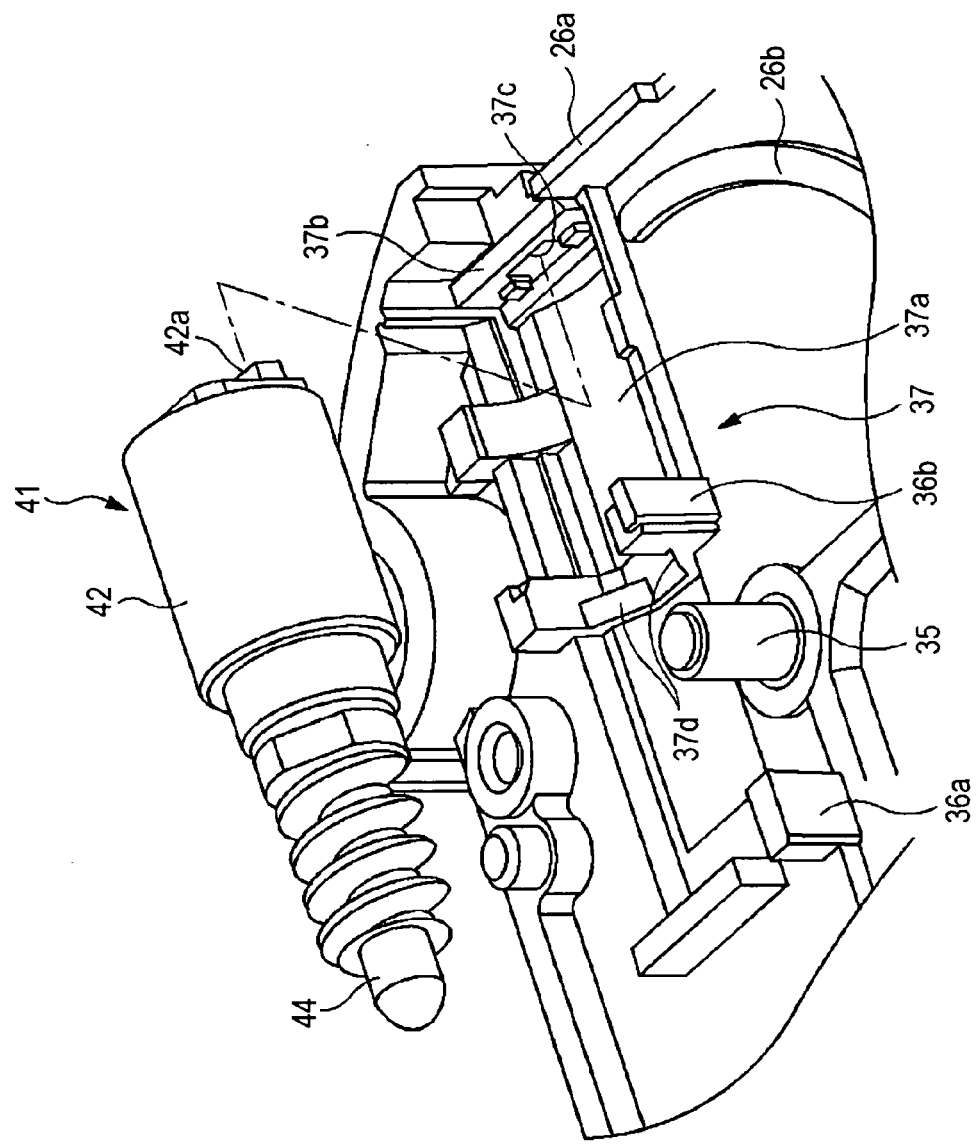
FIG. 6 is a perspective view of a major portion used to describe an attachment position of a drive motor.
Figure 7:
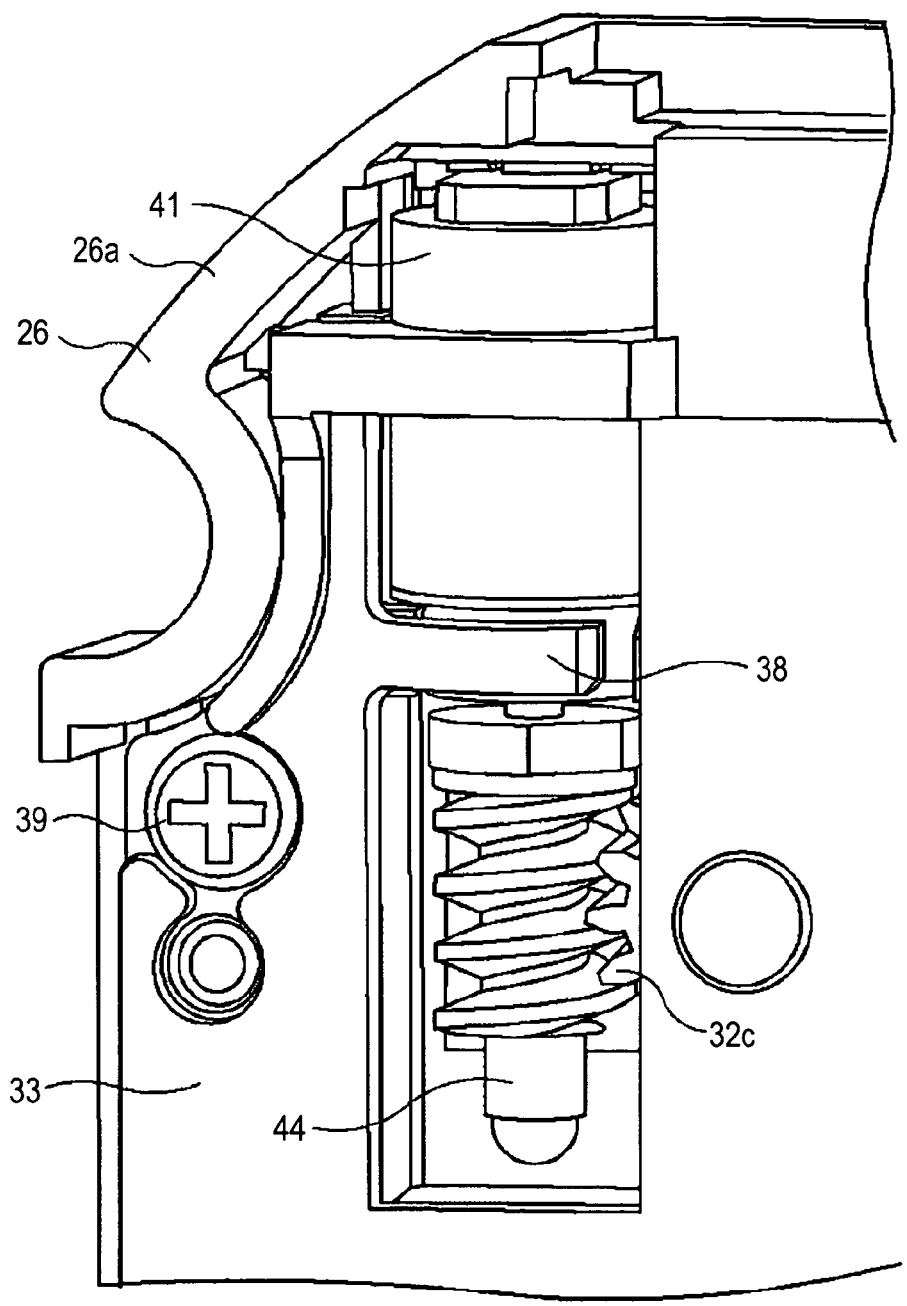
FIG. 7 is a perspective view of a major portion of a drive mechanism in which a cover member is attached to a chassis.
Figure 8:
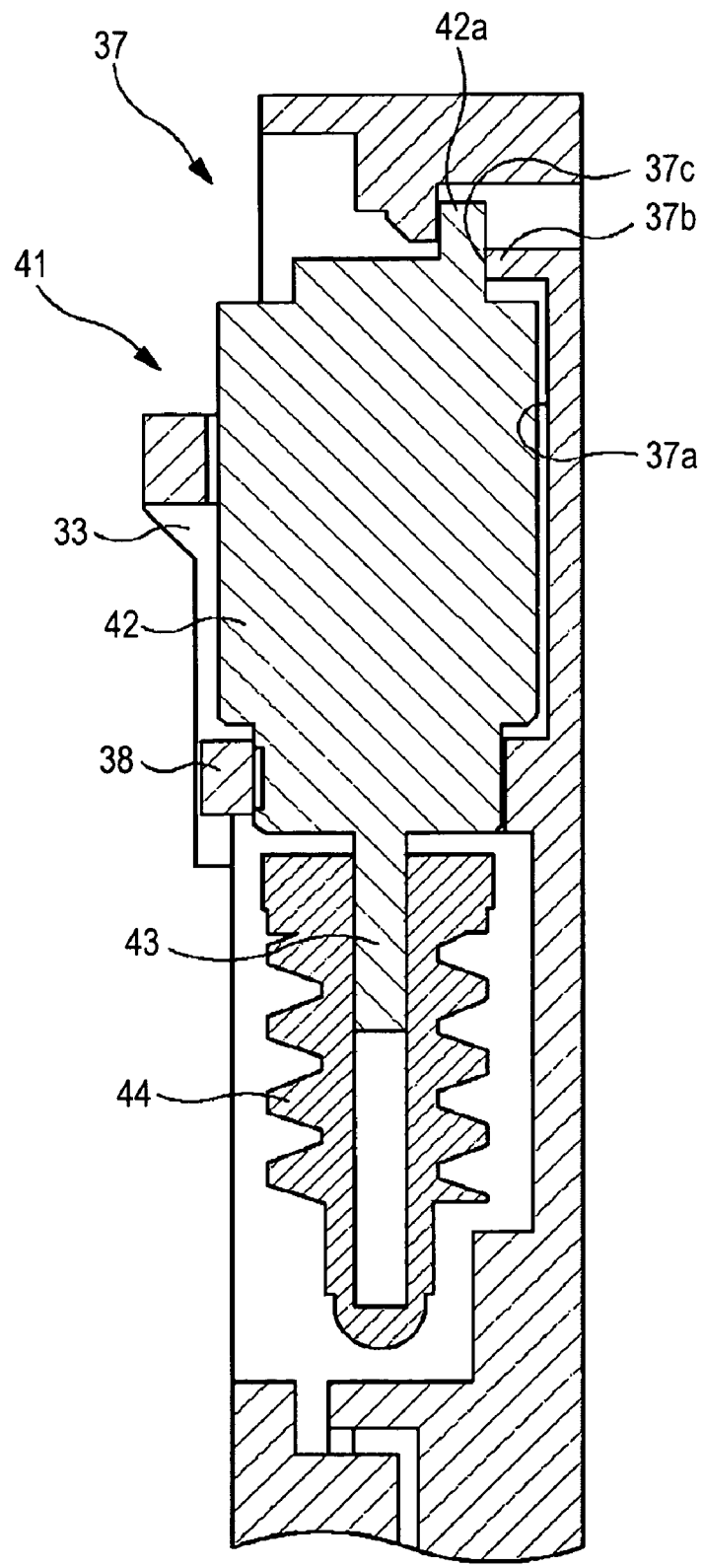
FIG. 8 is a cross section of a drive motor attached to the chassis.

As are shown in FIG. 6 through FIG. 8, the chassis 26 is provided with a motor holding portion 37 that is disposed adjacently to the boss 35 and holds a drive motor 41 of the drive mechanism 40 described below. The motor holding portion 37 is provided with a concave portion 37a in which is mounted a motor main body 42 of the drive motor 41 of substantially a cylindrical shape. The concave portion 37a of the motor holding portion 37 is formed at a position at which the rotation shaft 43 of the drive motor 41 is aligned with the x axis direction and a worm 44 attached to the rotation shaft 43 and a worm wheel 32c of the holder member 32 are meshed with each other. In the concave portion 37a of the motor holding member 37, a rising wall portion 37b is formed at the end portion in the axial direction of the rotation shaft 43 of the drive motor 41. The rising wall portion 37b is provided with a positioning hole 37c through which a positioning piece 42a in the xy plane of the motor main body 42 is inserted. Further, at a position spaced apart from the rising wall portion 37b, the concave portion 37a of the motor holding member 37 is provided with a V-shaped inclined portion 37d that receives the peripheral surface of the motor main body 42 as an axis determination member that performs the positioning of the motor main body 42 in the axial direction. As the positioning piece 42a of the motor main body 42 is inserted through the positioning hole 37c, the positioning of the motor holding member 37 is performed in the xy plane, that is, in a plane orthogonal to the optical axis 7. The positioning of the rotation shaft 43 of the drive motor 41 in the axial direction is then performed by the inclined portion 37d. It should be appreciated, however, that the motor holding member 37 is not necessarily provided with the positioning hole 37c and can be of any configuration as long as the positioning in the xy plane of the motor main body 42 can be performed. For example, it may be configured in such a manner that a positioning piece is provided to the concave portion 37a and a positioning hole corresponding to this positioning piece is provided to the motor main body.

The concave portion 37a of the motor holding portion 37 is formed in a size slightly longer than the rotation shaft 43 of the drive motor 41 attached with the worm 44 in full length in the axial direction (see FIG. 8). This configuration is to leave a margin that allows the drive motor 41 and the worm 44 to move in the x axis direction in the infrared light cut glass switching portion 16. The infrared light cut glass switching portion 16 is to compensate for interlocking caused by meshing between the worm 44 and the worm wheel 32c on the side of the drive motor 41.

The infrared light cut glass 31 held by the holder member 32 is an optical component that shields infrared light alone in transmitted light coming incident thereon from the side of the first group lens 11. The infrared light cut glass 31 has, for example, a rectangular principal surface that is substantially the same shape as the imaging element 17. Herein, descriptions will be given to a case where an infrared light cut glass is employed. It should be appreciated, however, that the present invention is not limited to this configuration and an optical component that suits an imaging condition, for example, a glass that corrects an optical path length, a lens that cuts visible light, and so forth are available.

The holder member 32 holding the infrared light cut glass 31 is a frame body in a thin-plate shape as a whole to hold the rim of the infrared light cut glass 31. An opening portion 32a of substantially the same size as the infrared light cut glass 31 is formed in the hold member 32 at the center. In the vicinity of one corner of its substantially rectangular shape, the holder member 32 includes a bearing portion 32b into which the boss 35 is loosely fit in a rotatable manner and the worm wheel 32c formed on the periphery of the bearing portion 32b. When the boss 35 is loosely fit into the bearing portion 32b of the holder portion 32, the entire holder member 32 is allowed to rotate on a plane orthogonal to the optical axis 7, that is, on the xy plane. The worm wheel 32c of the holder member 32 is a fan-like gear wheel formed on the periphery of the bearing portion 32b in the axial direction, that is, in the z axis direction. The worm wheel 32c is meshed with the worm 44 of the drive mechanism 40 so that a drive force from the drive motor 41 is transmitted so as to rotate the holder member 32 in association with rotations of the worm 44. The gear wheel of the worm wheel 32c is formed in such a manner that the infrared light cut glass 31 is allowed to rotate between the optical axis position at which the infrared light cut glass 31 is on the optical axis and the evacuation position at which the infrared light cut glass 31 is off the optical axis. An amount of rotation of the holder member 32 is regulated by the restriction pieces 36a and 36b of the chassis 26. More specifically, the holder member 32 is set at the optical axis position when the holder member 32 has been rotated by the drive mechanism 40 until the side surface of the holder member 32 parallel to the x axis direction abuts on the restriction piece 36a. Meanwhile, the holder member 32 is set at the evacuation position when the holder member 32 has been rotated by the drive mechanism 40 until the top surface of the holder member 32 parallel to the y axis direction abuts on the restriction piece 36b. It should be appreciated, however, that the restriction pieces 36a and 36b that regulate an amount of rotation of the holder member 32 are not necessarily formed at the positions specified above and can be formed at any positions as long as they can restrict rotations of the holder member 32 at predetermined positions. For example, the rising wall 26a of the chassis 26 parallel to the y axis direction may play a role of the restriction piece 36b. Alternatively, the restriction piece 36a may be provided to a position at which the bottom surface of the holder member 32 parallel to the x axis direction abuts thereon. Further, it is sufficient for the infrared light cut glass switching portion 16 to perform the positioning accurately at the optical axis position. Accuracy is not necessarily concerned for the restriction piece 36b and the restriction piece 36b may be omitted.

The cover member 33 of the infrared light cut glass switching portion 16 covers the holder member 32 and the drive mechanism 40. At substantially the center corresponding to the optical axis 7, the cover member 33 is provided with an opening portion 33a into which exiting light from the fifth group lens 15 is injected. Also, a pushing portion 38 that presses the drive motor 41 by pushing it in the z axis direction is provided to the cover member 33 at a position opposing the drive motor 41. The cover member 33 is provided with insertion holes 33b through which screws 39 fastened to the chassis 26 are inserted and a positioning piece 33c that performs the positioning with respect to the chassis 26. The positioning of the cover member 33 is performed by inserting the positioning piece 33c into the positioning hole 26c in the rising wall portion 26a of the chassis 26 and the cover member 33 is then fixed at a predetermined position on the chassis 26 by the screws 39. The positioning piece 33c is provided to stand on the peripheral surface of the cover member 33 spaced apart from the position at which the pushing portion 38 is provided. Owing to this configuration, the cover member 33 is fixed to the chassis 26 with the screws 39 in a more reliable manner and the drive motor 41 is pushed and held by the pushing portion 38.

The pushing portion 38 of the cover member 33 is a cantilever protrusion piece provided at a position opposing the drive motor 41 and it pushes the peripheral surface of the motor main body 42 of the drive motor 41 in the z axis direction when the cover member 33 is fixed to the chassis 26. The cover member 33 not only prevents the bearing portion 32b of the holder member 32 from falling off from the boss 35, but also pushes the drive motor 41 in the z axis direction.

The pushing portion 38 is provided with a pushing force small enough not to cause the drive motor 41 itself to move in a normal use but large enough to move in response to an output of the drive motor 41 when the holder member 32 is rotated until it abuts on the restriction piece 36a in order to prevent the interlocking between the gear wheel of the worm 44 and the gear of the worm wheel 32c.

The drive mechanism 40 that drives the holder member 32 to rotate includes the drive motor 41, the worm 44 fixed to the rotation shaft 43, and the worm wheel 32c formed integrally with the holder member 32. The drive mechanism 40 is a mechanism that transmits a rotational drive force from the drive motor 41 to the holder member 32 via the worm 44 and the worm wheel 32c. In other words, the drive mechanism 40 drives the infrared light cut glass 31 to rotate between the optical axis position at which the infrared light cut glass 31 is on the optical axis and the evacuation position at which the infrared light cut glass 31 is off the optical axis. The drive motor 41 of the drive mechanism 40 is held by the motor holding portion 37 of the chassis 26.

The drive motor 41 of the drive mechanism 40 includes a motor main body 42 of a bottomed cylindrical shape and a pair of stator magnets inside the motor main body 42. The drive motor 41 includes a rotor coil having the rotation shaft 43 at the center and provided on the inner side of the stator magnets. The motor main body 42 of the drive motor 41 is of a bottomed cylindrical shape. The positioning piece 42a is formed on one end face and the rotation shaft 43 is faced from the other end face along the axial direction. The positioning piece 42a of the drive motor 41 is inserted through the positioning hole 37c in the motor holding portion 37 of the chassis 26 to perform the positioning of the drive motor 41. The worm 44 is axially supported on the rotation shaft 43 provided to the rotor coil of the drive motor 41. The worm 44 provided to the drive motor 41 has a gear wheel in a spiral shape in a clockwise direction from the base end portion (motor main body 42) toward the tip end portion. In other words, the worm 44 is formed in such a manner that a rotation feed direction in which the infrared light cut glass 31 is driven toward the restriction piece 36a with rotations of the worm gear wheel is aligned with a direction in which the worm 44 comes close to the drive motor 41. In the infrared light cut glass switching portion 16, by continuing to drive the drive motor 41 further even after the holder member 32 abuts on the restriction piece 36a, a force is exerted in a direction in which the rotation shaft 43 attached with the worm 44 is pulled out from the drive motor 41. However, a force that pulls back the rotation shaft 43 into the drive motor 41 is exerted on the rotation shaft 43 by the stator magnets. This pulling back force is kept exerted after the drive motor 41 is stopped and a force acts in a direction in which the worm 44 comes close to the drive motor 41. Because a force acts in a direction in which the worm 44 comes close to the drive motor 41, a force acts in a direction in which the infrared light cut glass 31 is headed toward the restriction piece 36a via the worm wheel 32c meshed with the worm 44. Accordingly, the infrared light cut glass switching portion 16 keeps holding the holder member 32 at the optical axis position. A relation of the rotation feed direction of the worm 44 and the drive motor 41 is a configuration that maintains the holder member 32 at the optical axis position by exploiting the pulling back force described above.

It should be appreciated that the worm 44 of the drive mechanism 40 is not limited to a type provided with a gear wheel in the rotation direction specified above. The configuration can be changed as necessity arises according to the drive motor 41, the rotation feed direction of the gear of the worm 44, the worm wheel 32c, and the position of the infrared light cut glass 31. In other words, it is sufficient for the worm 44 that the rotation feed direction in which the infrared light cut glass 31 is driven toward the restriction piece 36a with rotations of the worm gear wheel is aligned with a direction in which the worm 44 comes close to the drive motor 41. For example, in a case where the motor main body 42 of the drive motor 41 is provided below the boss 35 of the chassis 26 in the x axis direction, the rotation feed direction of the gear wheel of the worm 44 becomes opposite to the direction described above.

In the infrared cut glass switching portion 16 having the configuration as above, the motor holding portion 37 is formed integrally with the chassis 26. Because all of the configurations to perform the positioning of the drive motor 41 are provided to the motor holding member 37 as integral part thereof, the positioning can be performed accurately at the assembly of the drive motor 41.

The infrared light cut glass switching portion 16 is configured in such a manner that the holder member 32 is driven to rotate from the evacuation position to the optical axis position by a rotational drive force of the drive motor 41. Also, the infrared light cut glass switching portion 16 is provided with the restriction piece 36a at the optical axis position and the optical axis position is defined as the holder member 32 abuts on the restriction piece 36a. The worm 44 provided to the drive motor 41 is formed in such a manner that a rotation feed direction in which the infrared light cut glass 31 is driven toward the restriction piece 36a with rotations of the worm gear wheel is aligned with a direction in which the worm 44 comes close to the drive motor 41. In the infrared light cut glass switching portion 16, by continuing to drive the drive motor 41 further even after the holder member 32 abuts on the restriction piece 36a, a force is exerted in a direction in which the rotation shaft 43 attached with the worm 44 is pulled out from the drive motor 41. However, a force that pulls back the rotation shaft 43 into the drive motor 41 is exerted on the rotation shaft 43 by the stator magnets. This pulling back force is kept exerted after the drive motor 41 is stopped and a force acts in a direction in which the worm 44 comes close to the drive motor 41. Because a force acts in a direction in which the worm 44 comes close to the drive motor 41, a force acts in a direction in which the infrared light cut glass 31 is headed toward the restriction piece 36a via the worm wheel 32c meshed with the worm 44. Accordingly, the infrared light cut glass switching portion 16 keeps holding the holder member 32 at the optical axis position. The infrared light cut glass 31 held by the holder member 32 is thus disposed precisely at the optical axis position. Accordingly, it is no longer necessary to slightly oversize the infrared cut glass 31 by taking rattling or the like into account. Further, even in a case where an external force such that causes the holder member 32 to move away from the optical axis position is exerted, it becomes possible to maintain the abutment on the restriction piece 36a.

In the infrared light cut glass switching portion 16, the drive motor 41 is held in the motor holding portion 37 in a state where the drive motor 41 is pushed by the pushing portion 38 of the cover member 33 and there is left a margin that allows the drive motor 41 to move in the axial direction of the rotation axis 43 to some extent. It thus becomes possible to prevent the interlocking between the gear wheel of the worm 44 and the gear of the worm wheel 32c.

Because the infrared light cut glass 31 rotates on a plane orthogonal to the optical axis 7, it becomes possible to suppress the infrared light cut glass switching portion 16 from becoming bulky in the direction of the optical axis 7. The full length of the lens barrel 5 can be thus shortened. Accordingly, not only is it possible to achieve a size reduction of the lens barrel 5, but it is also possible to increase an amount of light injected into the imaging element 17.

While descriptions have been given to the ability of the infrared light cut glass switching portion 16 to perform precise positioning of the infrared light cut glass 31 at the optical axis position, the infrared light cut glass 31 merely has to evacuate from the optical axis position at the evacuation position. In short, the evacuation position can be less accurate. It goes without saying, however, that the configuration at the optical axis position can be applied at the evacuation position. Also, the infrared light cut glass switching portion 16 is not necessarily provided on the side of the imaging element 17 of the lens barrel 5 as described above and it can be provided at any position within the barrel main body 10.

Operation of Infrared Light Cut Glass Switching Portion

An operation when the holder member 32 of the infrared light cut glass switching portion 16 in a state where it is off the optical axis 7 moves to the optical axis position will now be described.

Figure 9A:
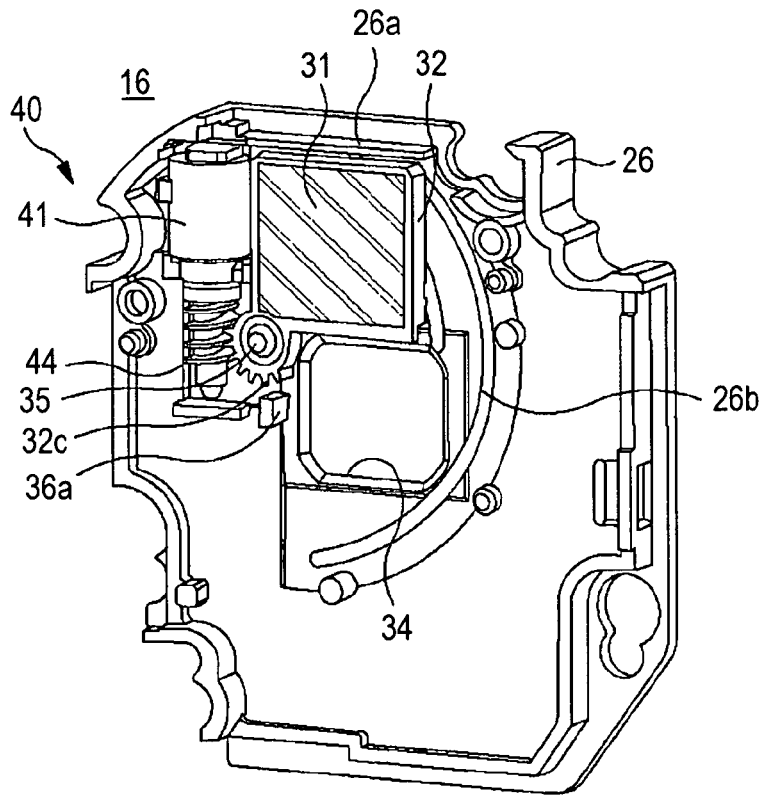
FIG. 9A is a perspective view used to describe a switching operation by the infrared light cut glass switching portion when the infrared light cut glass is at an evacuation position.
Figure 9B:
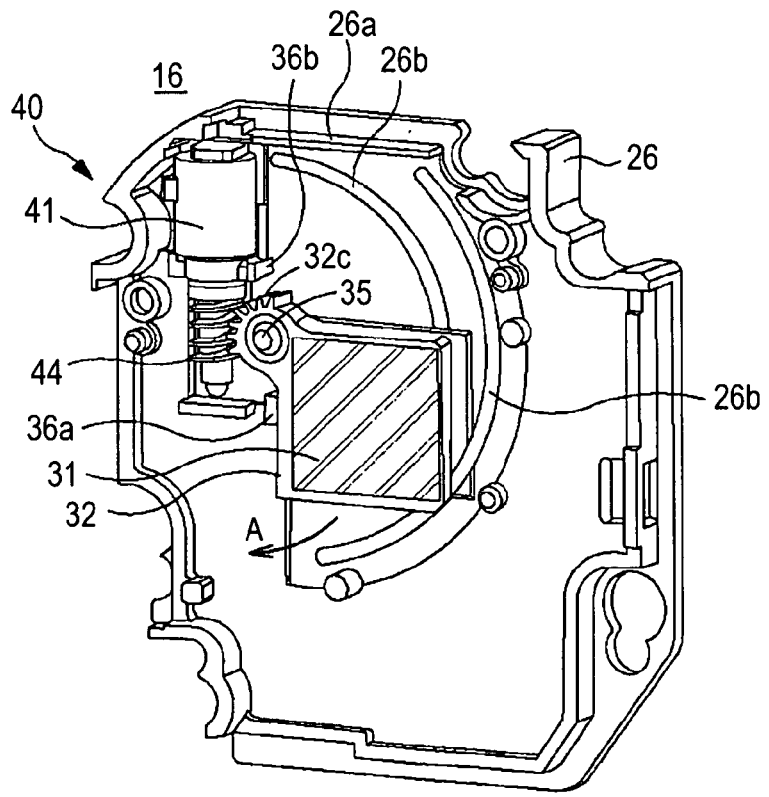
FIG. 9B is a perspective view used to describe a switching operation by the infrared light cut glass switching portion when the infrared light cut glass is at an optical axis position.

As is shown in FIG. 9A, the infrared light cut glass switching portion 16 is at the evacuation position at which the infrared light cut glass 31 is off the optical axis 7. When the user makes a switching operation to move the infrared light cut glass 31 from the evacuation position to the optical axis position, the drive motor 41 of the drive mechanism 40 is driven. As the drive motor 41 is driven to rotate, the worm 44 attached to the rotational shaft 43 starts to rotate and a rotational drive force is transmitted to the worm wheel 32c meshed with the worm 44. The holder member 32 is thus rotated toward the restriction piece 36a. When the holder member 32 abuts on the restriction piece 36a, the drive motor 41 can no longer rotate any further. As the drive motor 41 continues to transmit a drive force further, the worm 44 and the worm wheel 32c are meshed with each other, and a force that rotates the holder member 32 in a direction indicated by a letter A in FIG. 9B is exerted. In this instance, because the worm 44 is meshed with the worm wheel 32c whose rotation is restricted, a force is exerted in a direction in which the rotation shaft 43 is pulled out from the motor main body 42. However, a force pulling back the rotation shaft 43 into the drive motor 41 exerted by the stator magnets acts on the rotation shaft 43. The pulling back force keeps acting on the rotational shaft 43 after the drive motor 41 is stopped and a force acts in a direction in which the worm 44 comes close to the drive motor 41. Because a force acts in a direction in which the worm 44 comes close to the drive motor 41, a force acts in a direction in which the infrared light cut glass 31 heads toward the restriction piece 36a via the worm wheel 32c meshed with the worm 44. The infrared light cut glass switching portion 16 thus keeps holding the holder 32 at the optical axis position and then switches the infrared light cut glass 31 precisely to the optical axis position. Also, in the infrared light cut glass switching portion 16, because the drive motor 41 is held movably in the axial direction of the rotation shaft 43, it becomes possible to prevent the interlocking between the gear wheel of the worm 44 and the gear of the worm wheel 32c by allowing the entire drive motor 41 to move.

Second Embodiment

An infrared light cut glass switching portion according to another embodiment of the present invention will now be described as a second embodiment. Hereinafter, the configurations same as those of the infrared light cut glass switching portion 16 are labeled with the same reference numerals and descriptions are omitted.

The infrared light cut glass switching portion described in the second embodiment is provided with a drive mechanism 50 having a worm 51 and a worm wheel 52 as shown in FIG. 10A through FIG. 11C instead of the worm 44 and the worm wheel 32c of the drive mechanism 40.

Figure 10A:
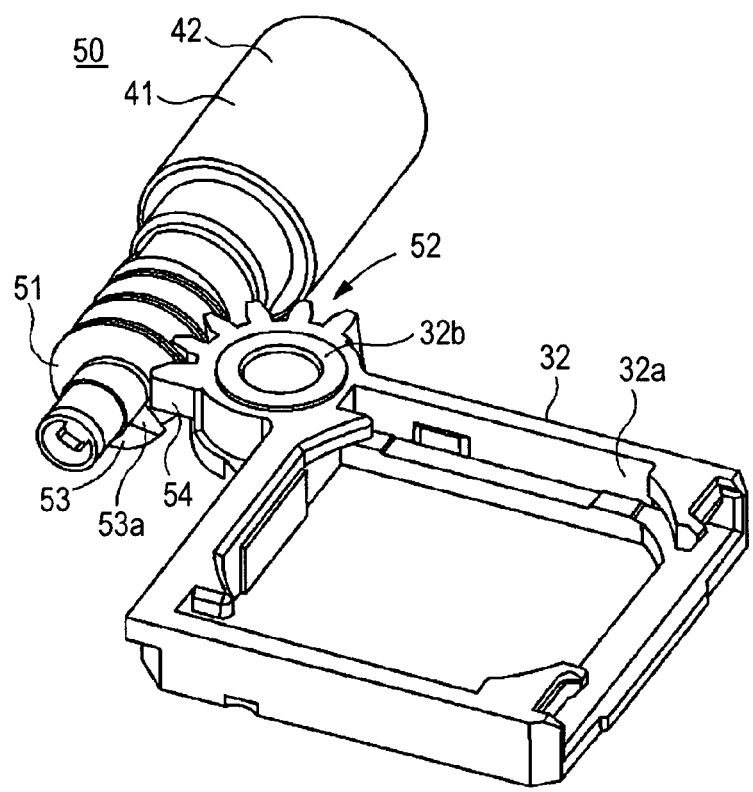
FIG. 10A is a perspective view showing a drive mechanism of an infrared light cut glass switching portion as another embodiment of the present invention.

As is shown in FIG. 10A, the worm 51 of the drive mechanism 50 is provided with a gear wheel having the same rotation feed direction as the worm 44 and it is attached to the rotation shaft 43 of the drive motor 41. An abutment portion 53 is provided to the tip end of the gear wheel. Rotations from the drive motor 41 are restricted as the abutment portion 53 of the worm 51 abuts on a restriction portion 54 of the worm wheel 52, so that the drive motor 41 is locked. As is shown in FIG. 11B, the abutment portion 53 of the worm 51 has an abutment surface 53a formed on a plane encompassing the rotation shaft 43 and the abutment surface 53a is continuous with the gear wheel at the tip end of the worm 51. The abutment portion 53 is formed at a position at which the abutment plane 53a abuts on the restriction portion 54 at timing slightly later than the timing at which the holder member 32 abuts on the restriction piece 36a. Owing to this configuration, it becomes possible to prevent the interlocking between the gear wheel of the worm 51 and the gear of the worm wheel 52.

Figure 10B:
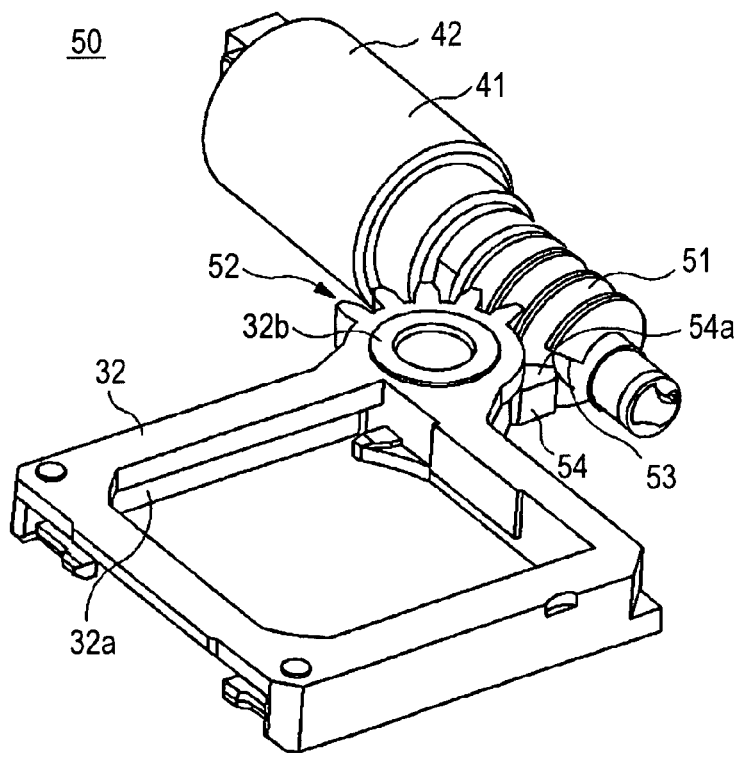
FIG. 10B is a perspective view of the drive mechanism of FIG. 10A when viewed from the rear surface.
Figure 11A:
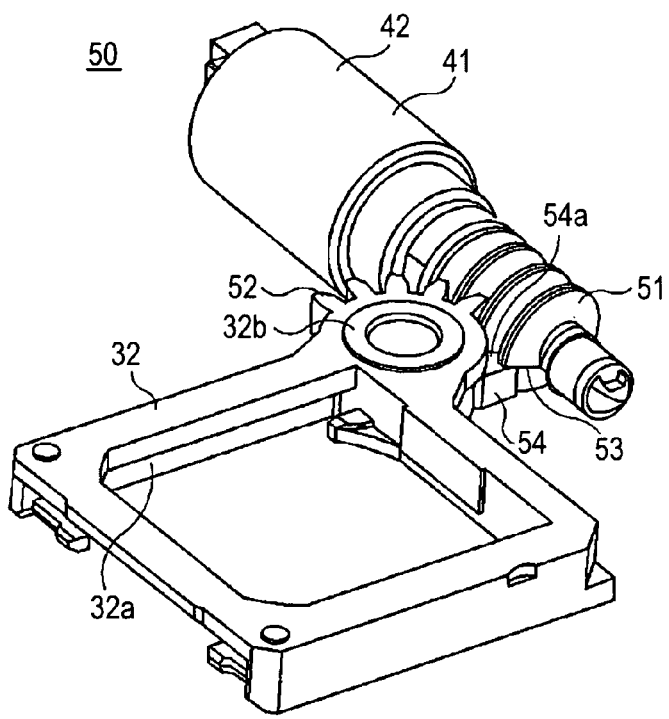
FIG. 11A is a perspective view showing a manner in which an abutment portion of a worm is restricted by abutting on a restriction portion of a worm wheel.
Figure 11B:
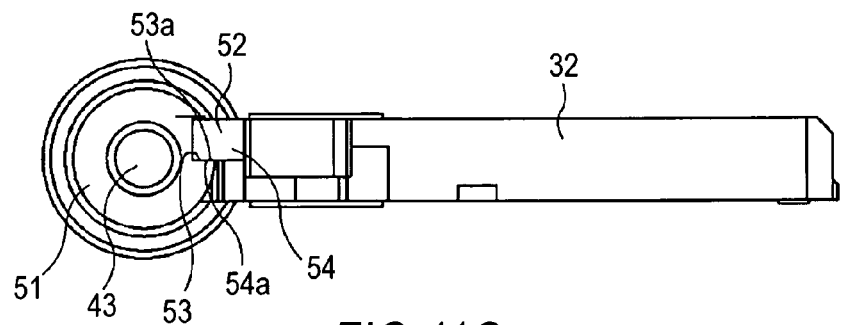
FIG. 11B is a plan view showing the worm and the worm wheel in a direction orthogonal to a rotation shaft.
Figure 11C:
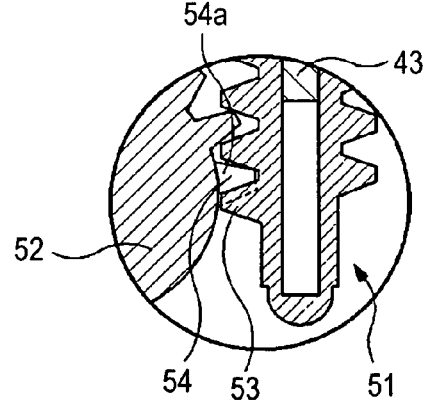
FIG. 11C is a cross section of a major portion of the worm and the worm wheel.

As are shown in FIG. 10B and FIG. 11A, the restriction portion 54 of the worm wheel 52 is a protrusion piece that abuts on the abutment portion 53 of the worm 51 when the holder member 32 is at the optical axis position. As is shown in FIG. 11B, the restriction portion 54 has a plane 54a that abuts on the abutment portion 53 on the xy plane encompassing the rotation shaft 43. In other words, the restriction portion 54 is a protrusion piece formed of the last gear of the worm wheel 32c meshed with the worm 44 when the holder member 32 is at the optical axis position made in a size too large to be meshed with the worm 51 (see FIG. 11C).

In the infrared light cut glass switching portion having the worm 51 and the worm wheel 52, the abutment portion 53 abuts on the restriction portion 54 at timing slightly later than the timing at which the holder member 32 abuts on the restriction piece 36a. The worm 51 is thus locked as the rotations thereof are restricted. When the abutment portion 53 abuts on the restriction portion 54, the interlocking between the wheel gear of the worm 51 and the gear of the worm wheel 52 can be prevented.

It should be appreciated that the configuration of the abutment portion 53 and the restriction portion 54 is not limited to the configuration described above, and they can be configured in any manner as long as rotations of the worm 51 can be restricted by the worm wheel 52 at timing slightly later than the timing at which the holder member 32 abuts on the restriction piece 36a. Accordingly, the restriction portion 54 is not limited to the configuration having the plane 54a on which to abut the abutment surface 53a of the abutment portion 53 on the xy plane encompassing the rotation shaft 43. Also, the abutment portion 53 does not necessarily abut on the restriction portion 54 in a direction to press the restriction portion 54 in the z axis direction. Further, descriptions have been given to the abutment portion 53 and the restriction portion 54 in a case where they abut on each other on the plane surfaces. It should be appreciated, however, that the present invention is not limited to this configuration and it may be configured in such a manner that the abutment surface of the abutment portion 53 is inclined so that the restriction portion 54 is pressed in a direction in which the holder member 32 abuts on the restriction piece 36a.

Modification

Figures 12A, 12B:
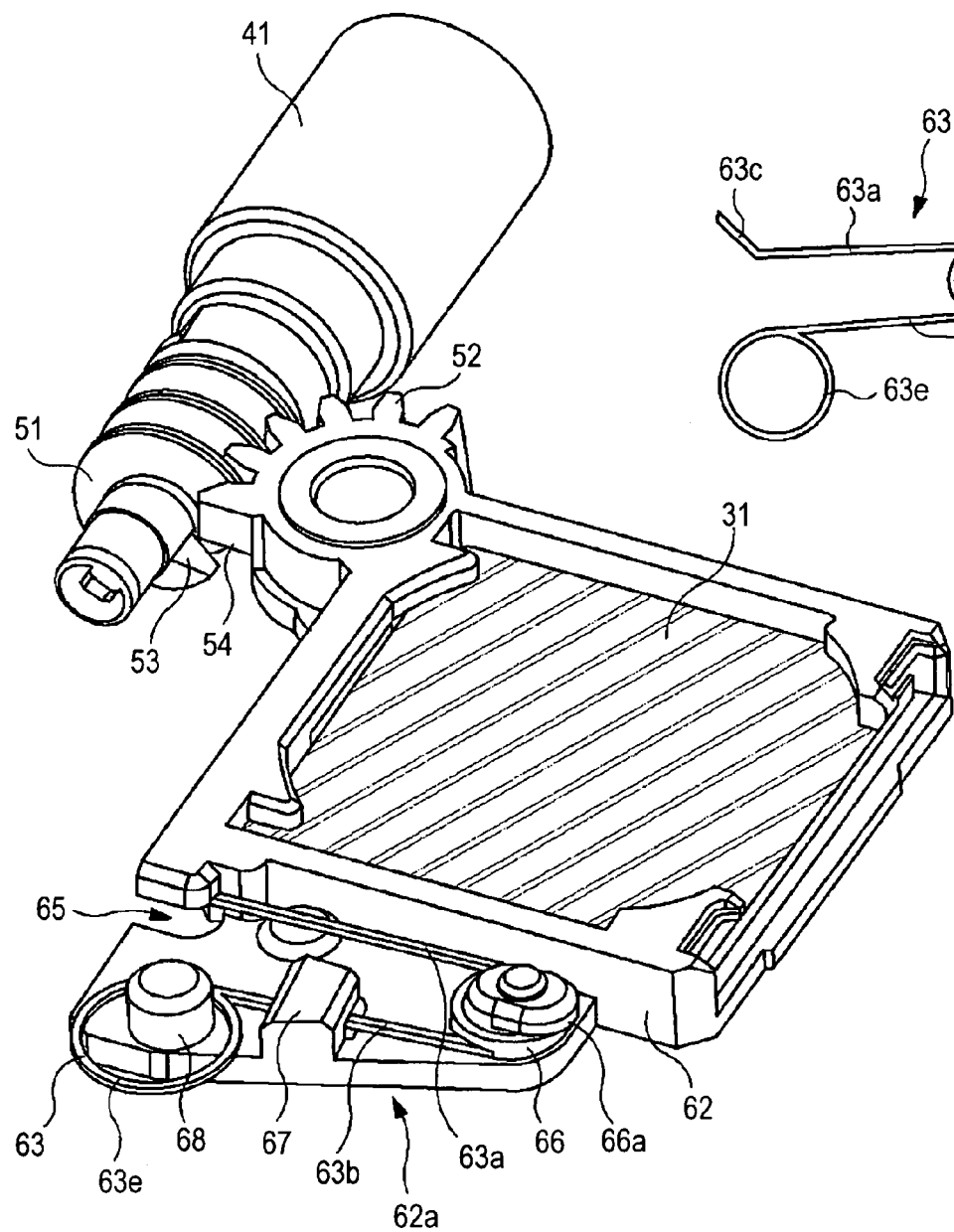
FIG. 12A is a perspective view used to describe a pushing mechanism of an infrared light cut glass switching portion as still another embodiment of the present invention.
FIG. 12B is a plan view of a spring member.
Figure 13:
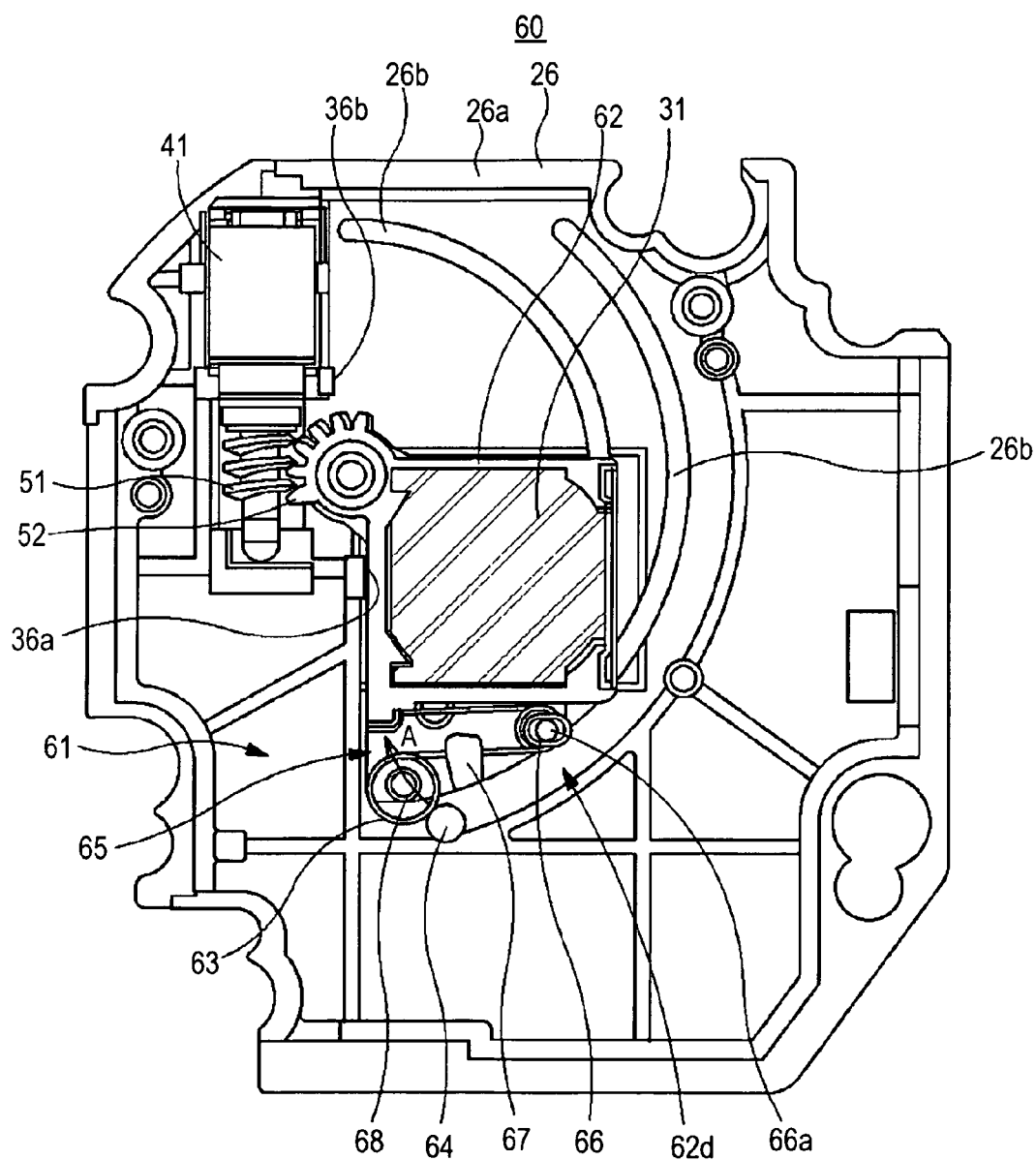
FIG. 13 is a plan view of the infrared light cut glass switching portion having the pushing mechanism.

The infrared light cut glass switching portion having the worm 51 and the worm wheel 52 may further include a pushing mechanism 61 that pushes the holder member 32 to the restriction piece 36a at the optical axis position as are shown in FIGS. 12A and 12B and FIG. 13.

As are shown in FIGS. 12A and 12B and FIG. 13, an infrared light cut glass switching portion 60 as a modification includes the pushing mechanism 61 having a spring member 63 attached to a holder member 62 and a boss 64 pressed by the spring member 63 when the holder member 62 is at the optical axis position.

The holder member 62 to which is attached the spring member 63 of the pushing mechanism 61 is of the same configuration as the holder member 32 described above except that a holding portion 62a holding the spring member 63 is further provided. To be more concrete, the holder member 62 is a frame body in a thin-plate shape as a whole to hold the rim of the infrared light cut glass 31. The holding portion 62a of the holder member 62 is formed of a thin plate in substantially a triangular shape when viewed in a plane provided on the lower side of the frame body in the y axis direction. On its principal surface, the holding member 62a has an arm stopper portion 65 at which a stopper portion 63c of a first elastic arm 63a of the spring member 63 is stopped. Further, the holding portion 62a has an engagement portion 66 with which a ring engagement portion 63d of the spring member 63 is engaged, an arm stopper portion 67 at which a second elastic arm 63b is stopped, and a boss 68.

The arm stopper portions 65 and 67 of the holding portion 62a stop the first and second elastic arms 63a and 63b, respectively. The arm stopper portion 65 is formed integrally with the side wall of the frame body of the holder member 62. Also, the arm stopper portion 67 has a cross section formed in substantially a shape of a letter U, at which the second elastic arm 63b is stopped elastically. The engagement portion 66 is a column-shaped boss provided to stand on the principal surface of the holding member 62a and a retaining portion 66a of substantially an elliptical shape having its center biased to the boss is provided at the tip end of the boss so that the spring member 63 is retained not to fall off. A ring stopper portion 63e formed at the tip end of the second elastic arm 63b is stopped elastically at the boss 68.

The spring member 63 of the pushing mechanism 61 includes the first elastic arm 63a, the second elastic arm 63b, and the ring engagement portion 63d continuous with the first and second elastic arms 63a and 63b and engaged with the holder member 62. The first elastic arm 63a of the spring member 63 is bent at the tip end so as to form the stopper portion 63c that is stopped at the arm stopper portion 65 while the base end thereof is formed to be continuous with the ring engagement portion 63d. The second elastic arm 63b is continuous with the ring engagement portion 63d at the base end and the ring stopper portion 63e stopped at the boss 68 is formed at the tip end.

The respective portions of the spring member 63 are formed integrally by bending a single wire. The spring member 63 is stopped at the holding portion 62a of the holder member 62 while it is kept pushed in a direction in which the first and second elastic arms 63a and 63b are spaced apart from each other. The spring member 63 is configured in such a manner that the stopper portion 63c of the first elastic arm 63a is stopped at the arm stopper portion 65 and the second elastic arm 63b is stopped at the arm stopper portion 67. In this instance, the spring member 63 is stopped at the respective arm stopper portions 65 and 67 while it is allowed to undergo elastic deformation in a direction in which the first and second elastic arms 63a and 63b come close to each other. Further, the spring member 63 is configured in such a manner that the ring engagement portion 63d is engaged with the engagement portion 66 so that it is attached integrally to the holder member 62. The ring stopper portion 63e of the spring member 63 is stopped on the holder member 62 at a remotest position from the boss 35 serving as the rotational supporting point. The boss 64 formed on the chassis 26 is formed in such a manner that a part thereof is positioned on the rotation region of the ring stopper portion 63e. To be more concrete, when the holder member 62 is at the optical axis position, the boss 64 is provided at a position at which it presses the ring stopper portion 63e so that it presses the holder member 62 attached with the ring stopper portion 63e toward the restriction piece 36a. Accordingly, while the holder member 62 is at the optical axis position, the boss 64 keeps pushing the holder member 62 toward the restriction piece 36a via the ring stopper portion 63e.

In this instance, the ring stopper portion 63e being pressed becomes continuous with the ring engagement portion 63d and the ring engagement portion 63d is engaged with the engagement portion 66 of the holder member 62. Accordingly, a pressing force from the ring stopper portion 63e is transmitted to the holder member 62 and presses the holder member 62 itself toward the restriction piece 36a. Hence, because the holder member 62 is kept pushed to stay at the optical axis position by the spring member 63 and the boss 64 while the holder member 62 is at the optical axis position, the infrared light cut glass switching portion 60 becomes able to perform the positioning of the infrared light cut glass 31 precisely.

When a switching operation to move the infrared light cut glass 31 from the evacuation position to the optical axis position is made, the infrared light cut glass switching portion 60 drives the drive motor 41 of the drive mechanism 40 to rotate the holder member 62 toward the optical axis position via the worm 51 and the worm wheel 52. A part of the peripheral surface of the ring stopper portion 63e of the spring member 63 attached to the holder member 62 abuts on the boss 64 just before the holder member 62 reaches the optical axis position. A drive force from the drive motor 41 is further transmitted to the ring stopper portion 63e abutting on the boss 64. The ring stopper portion 63e thus contracts toward the first elastic arm 63a against a pushing force of the spring so as to avoid the boss 64. The holder member 62 is kept rotated until the center of the ring stopper portion 63e is positioned on the side closer to the boss 35 than the center of the boss 64 in the y axis direction. In other words, in the infrared light cut glass switching portion 60, the entire holder member 62 is rotated until the ring stopper portion 63e attached to the holder member 62 contracts so as to avoid the boss 64 and is positioned on the side closer to the boss 35 serving as the rotation supporting point of the holder member 62. Once the holder member 62 reaches the optical axis position, rotations are restricted due to restriction by the restriction piece 36a. In this instance, however, the ring stopper portion 63e is pressed by the boss 64. Because the boss 64 presses the ring stopper portion 63e on the side closer to the boss 35 serving as the rotation supporting point of the holder member 62 in the y axis direction, the boss 64 consequently presses the holder member 62 toward the restriction piece 36a.

The infrared light cut glass switching member 60 according to the embodiment of the present invention configured as above maintains the holder member 62 at the optical axis position because the spring member 63 keeps pressing the boss 64. Hence, the infrared light cut glass 31 held by the holder member 62 is disposed precisely at the optical axis position. It is therefore no longer necessary to slightly oversize the infrared light cut glass 31 by taking rattling into account. Further, even in a case where an external force such that causes the holder member 62 to move away from the optical axis position is exerted, it becomes possible to maintain the abutment on the restriction piece 36a owing to the action of the worm 51 and the worm wheel 52 and a pushing force of the spring member 63. In addition, the infrared light cut glass switching portion 60 is configured in such a manner that the abutment portion 53 of the worm 51 abuts on the restriction portion 54 of the worm wheel 52 at the optical axis position so as to restrict rotations of the worm 51. It thus becomes possible to prevent the interlocking between the gear wheel of the worm 51 and the gear of the worm wheel 52.

As with the infrared light cut glass switching portion 16, it is possible to suppress the infrared light cut glass switching portion 60 from becoming bulky in the direction of the optical axis 7 because the infrared light cut glass 31 rotates on a plane orthogonal to the optical axis 7. The full length of the lens barrel 5 can be thus shortened. Hence, not only is it possible to achieve a size reduction of the lens barrel 5, but it is also possible to increase an amount of light to be injected into the imaging element 17.

Further, because the infrared light cut glass switching portion 60 is configured in such a manner that ring stopper portion 63e and the boss 64 abut on each other on the circular peripheral surfaces, they are formed in shapes such that reduces rotational resistance of the holder member 62, which can in turn lessen a load applied on the drive motor 41. Accordingly, it is not necessary to employ the drive motor 41 of a large size.

It should be appreciated, however, that the infrared light cut glass switching portion 60 is not necessarily provided with the pushing mechanism 61 having the spring member 63 as described above. In other words, the infrared light cut glass switching portion 60 may be configured in such a manner that the spring member 63 is provided to the chassis 26 while the boss 64 is provided to the holder member 62. Further, instead of the spring member 63, for example, a pin that abuts on the boss 64 and presses the holder member 62 in a direction indicated by an arrow A in FIG. 13 may be provided to stand on the holder member 62. In this instance, the pin provided to stand abuts on the boss 64 just before the holder member 62 reaches the optical axis position and it is necessary to provide a mechanism that allows the pin to avoid the boss 64 first by surmounting the boss 64 so as to be positioned on the side closer to the boss 35 in the y axis direction.

It should be appreciated that the infrared light cut glass switching portion 60 is not necessarily provided with the pushing mechanism 61 in addition to the worm 51 and the worm wheel 52 as described above. For example, the pushing mechanism 61 may be applied to the infrared light cut glass switching portion 16 having the worm 44 and the worm wheel 32c described in the first embodiment above. Further, an infrared light cut glass switching portion having the pushing mechanism 61 alone may be employed.

It should be appreciated that the present invention is not limited to the embodiments described above and it goes without saying that various modifications are possible without deviating from the scope of the invention.

What is claimed is:

1. A switching mechanism for optical component comprising:
    an optical component;
    a holder member holding the optical component;
    a drive mechanism having a drive motor that drives the optical component held by the holder member to rotate on a plane orthogonal to an optical axis from an optical axis position at which the optical component is on the optical axis to an evacuation position at which the optical component is off the optical axis; and
    a restriction member restricting a rotation of the holder member, by which at least a rotation of the optical component held by the holder member is restricted at the optical axis position,
    wherein the drive mechanism includes
    the drive motor,
    a worm attached to a rotation shaft of the drive motor, and
    a worm wheel meshed with the worm and provided to the holder member, and
    a rotation feed direction in which the optical component is driven toward the restriction member at the optical axis position with a rotation of the worm is a direction in which the optical component comes close to the drive motor.

2. The switching mechanism for optical component according to claim 1,
    wherein the optical component is an optical component that shields infrared light.

3. The switching mechanism for optical component according to claim 1,
    wherein the drive motor is held by a holding member that holds the drive motor in a movable manner in an axial direction of the rotation shaft.

4. The switching mechanism for optical component according to claim 3,
    wherein each of the drive motor and the holding member is provided with
    a positioning member that performs positioning on the plane, and a shaft determination member that defines an axial direction of the rotation shaft of the drive motor.

5. The switching mechanism for optical component according to claim 1,
wherein each of the worm wheel and the worm is provided with
a restriction portion that restricts a rotation of the worm, and
an abutment portion that abuts on the restriction portion when the optical component is at the optical axis position.

6. A lens barrel comprising:
an optical component provided inside a cylindrical barrel main body into which light is injected from one end;
a holder member holding the optical component;
a drive mechanism provided inside the barrel main body and having a drive motor that drives the optical component held by the holder member to rotate on a plane orthogonal to an optical axis from an optical axis position at which the optical component is on the optical axis to an evacuation position at which the optical component is off the optical axis; and
a restriction member restricting a rotation of the holder member, by which at least a rotation of the optical component held by the holder member is restricted at the optical axis position,
wherein the drive mechanism includes
the drive motor,
a worm attached to a rotation shaft of the drive motor, and
a worm wheel meshed with the worm and provided to the holder member, and
a rotation feed direction in which the optical component is driven toward the restriction member at the optical axis position with a rotation of the worm is a direction in which the optical component comes close to the drive motor.

7. An imaging device comprising:
an imaging device main body; and
a lens barrel provided in one of a manner by which the lens barrel is formed integrally with the imaging device main body and a manner by which the lens barrel is connected to the imaging device main body,
wherein the lens barrel includes
an optical component provided inside a cylindrical barrel main body into which light is injected from one end,
a holder member holding the optical component,
a drive mechanism provided inside the barrel main body and having a drive motor that drives the optical component held by the holder member to rotate on a plane orthogonal to an optical axis from an optical axis position at which the optical component is on the optical axis to an evacuation position at which the optical component is off the optical axis, and
a restriction member restricting a rotation of the holder member, by which at least a rotation of the optical component held by the holder member is restricted at the optical axis position,
the drive mechanism includes
the drive motor,
a worm attached to a rotation shaft of the drive motor, and
a worm wheel meshed with the worm and provided to the holder member, and
a rotation feed direction in which the optical component is driven toward the restriction member at the optical axis position with a rotation of the worm is a direction in which the optical component comes close to the drive motor.

* * * * *